United States Patent [19]

Cowan

[11] 4,429,902
[45] Feb. 7, 1984

[54] REMOTELY RELEASABLE CONNECTOR

[75] Inventor: William S. Cowan, West University Place, Tex.

[73] Assignee: Armco Inc., Middletown, Ohio

[21] Appl. No.: 188,584

[22] Filed: Sep. 18, 1980

[51] Int. Cl.³ .............................................. F16L 37/08
[52] U.S. Cl. .......................................... 285/3; 285/4; 285/18; 285/85; 285/315; 285/317; 285/DIG. 21; 166/340; 29/426.6
[58] Field of Search ....................... 285/18, 84, 85, 86, 285/92, 308, 315, 316, 317, 3, 4, DIG. 21, 39; 166/340; 29/426.1, 426.5, 426.6

[56] References Cited

U.S. PATENT DOCUMENTS

| | | | |
|---|---|---|---|
| 989,257 | 4/1911 | Herndon | 285/85 X |
| 992,050 | 5/1911 | Peterson | 285/85 |
| 3,268,241 | 8/1966 | Castor et al. | 285/317 X |
| 3,628,812 | 12/1971 | Larralde | 285/315 X |
| 4,185,856 | 1/1980 | McCaskill | 285/317 X |
| 4,209,191 | 1/1980 | Lawson | 285/84 |
| 4,216,982 | 8/1980 | Chow | 285/315 |

*Primary Examiner*—Dave W. Arola
*Attorney, Agent, or Firm*—Roylance, Abrams, Berdo & Goodman

[57] ABSTRACT

A remotely releasable connector for a pair of pipes including first and second sets of engageable threads on the first and second pipes, first and second aligned recesses on the exterior of the pipes, a latch received in both recesses to prevent relative rotation of the pipes, and a release ring supported around the exterior of the pipes and longitudinally movable therealong to engage the latch to remove it from the locking position.

30 Claims, 19 Drawing Figures

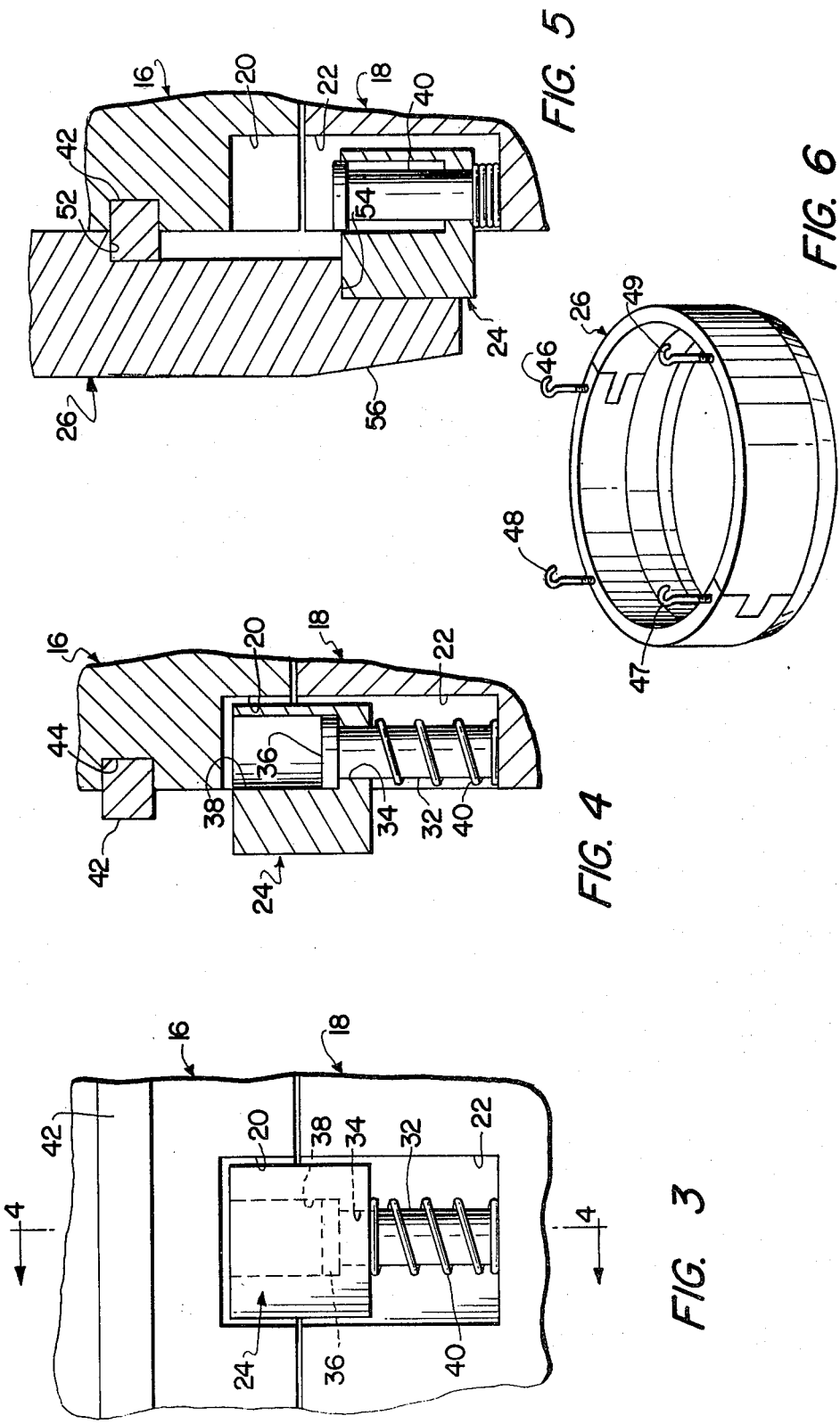

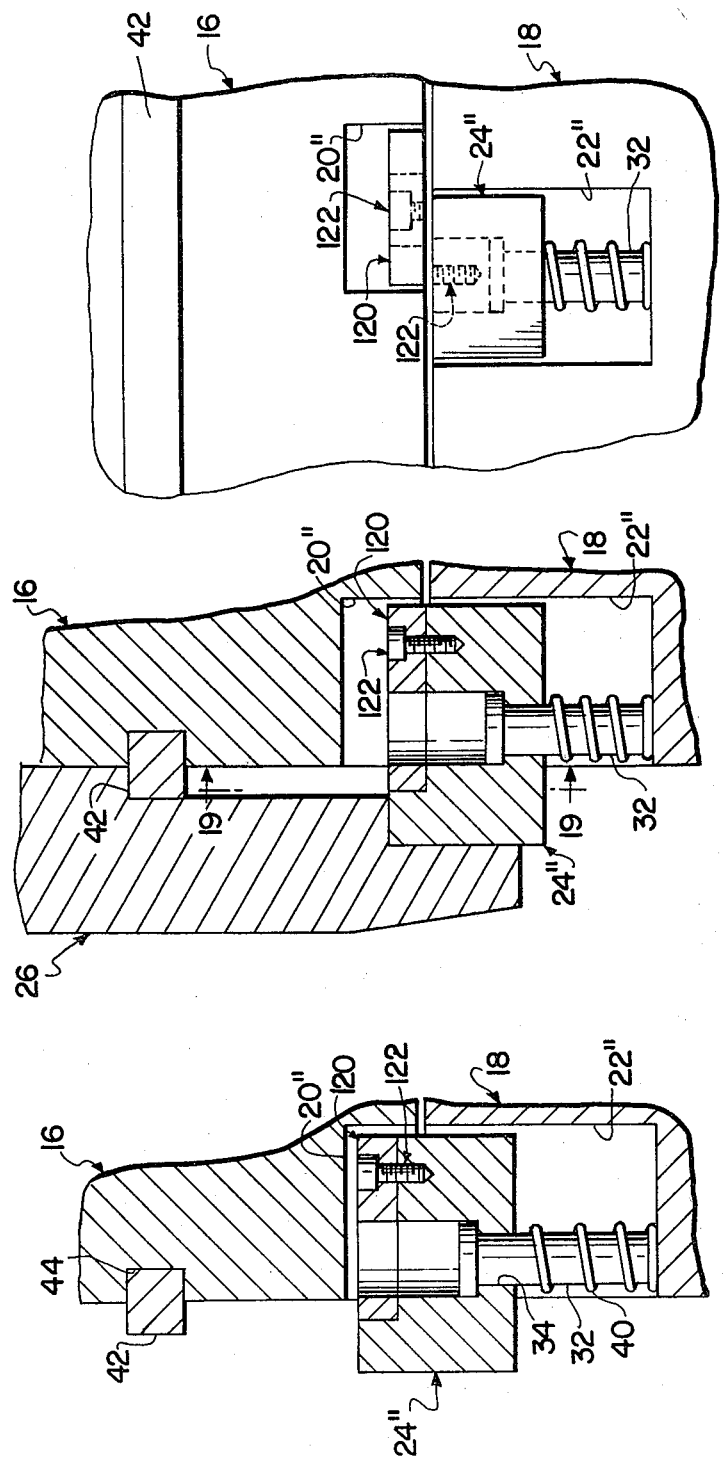

REMOTELY RELEASABLE CONNECTOR

FIELD OF THE INVENTION

The invention relates to a remotely releasable connector for, e.g., underwater well pipe. The connector threadedly couples adjacent joints of pipe, with lead or no lead threads. A latch is used to prevent relative rotation that would uncouple the joints. This latch is remotely released by engagement with a release ring riding on the exterior of the joints.

BACKGROUND OF THE INVENTION

Large diameter pipe strings are extensively used in the search for and production of oil and gas lying below the sea. These pipe strings, used with an offshore drilling vessel or platform, are typically made up of joints of pipe which are up to 60 feet in length and 36 inches in outer diameter. The length of the combined string can range from hundreds to thousands of feet.

Adjacent joints of pipe are typically threadedly engaged by helical threads or by interrupted threads of the lead or no lead type.

Because of the extreme conditions experienced by the pipe strings, it is highly advantageous to provide a locking mechanism preventing disconnection of the couplings of adjacent joints of pipe. It is also highly advantageous to provide a mechanism for remotely releasing such connection to avoid sending a diver into the water.

Examples of such remotely releasable connectors are disclosed in U.S. Pat. Nos. 3,100,655 issued to Work; 3,339,947 issued to Maisey; 3,895,829 issued to Manson; and 3,948,545 issued to Bonds.

While the mechanisms disclosed in these patents provide a remote release of the connection, they are not extremely reliable and are extremely complicated to manufacture. Thus, there has been a continuing need for improvement in remotely releasable connectors for, e.g., underwater well pipe.

OBJECTS OF THE INVENTION

Accordingly, a general object of the invention is to devise a remotely releasable pipe connector of the type described which is highly reliable and simply constructed.

Another object is to provide such a remotely releasable connector in which the releasing mechanism is external of the pipe string to avoid accidental release during normal operations inside the pipe string.

A further object is to provide such a connector with no extreme shoulders on the exterior surface.

SUMMARY OF THE INVENTION

Basically, the remotely releasable connector for a pair of pipes according to the invention comprises the combination of first and second sets of engageable threads coupled to the first and second pipes; a first recess in the exterior of the first pipe; a second recess in the exterior of the second pipe, the recesses being substantially aligned when the pipes are threadedly engaged; a latch; an assembly for supporting the latch in a locking position so that a first part is located in the first recess and a second part is located in the second recess, thereby preventing disengagement of the pair of pipes; and a release ring, supported around the exterior of the pipes, for moving the latch out of the locking position by contacting the latch upon movement of the release ring longitudinally of the pipes.

More specifically, a first embodiment of the invention comprises a latch that is spring biased upwardly into the locking position and which is moved out of the locking position by the ring moving downwardly of the pipes.

In a second embodiment, the latch is spring biased downwardly into the locking position and is actuated out of the locking position by upward movement of the release ring, which contacts a spring biased latch pin slidably received in the latch.

In a third embodiment, the latch has a base portion secured in one of the recesses and a locking portion extending therefrom via a frangible coupling so that movement of the release ring longitudinally of the pipes breaks the locking portion away from the base portion to remotely release the connector.

In a fourth embodiment the latch is spring biased upwardly into the locking position and is moved out of this position by a radially inwardly biased slidable latch pin carried by the ring.

In a fifth embodiment, the latch is spring biased upwardly into the locking position and has a removable portion coupled thereto by a frangible shear pin, the ring moving the removable portion into a position spanning the parting line of the male and female connector members, which break the shear pin and remove the removable portion from the latch upon relative rotation.

DRAWINGS

In order that the manner in which the foregoing and other objects are achieved according to the invention can be understood in detail, particularly advantageous embodiments thereof will be described with reference to the accompanying drawings, which form part of the original disclosure of this application, and wherein:

FIG. 3 is an enlarged elevational view of the latch shown in FIG. 1 in the locking position;

FIG. 4 is a sectional view taken along lines 4—4 in FIG. 3 of the latch in the locking position;

FIG. 5 is a view similar to that shown in FIG. 4 except that the release ring has moved downwardly into contact with the latch moving it from the locking position;

FIG. 6 is a perspective view of the release ring;

FIG. 17 is a sectional view of a fifth embodiment of the invention with the latch in a locking position, the latch having a removable portion coupled thereto by a shear pin;

Figure 2:
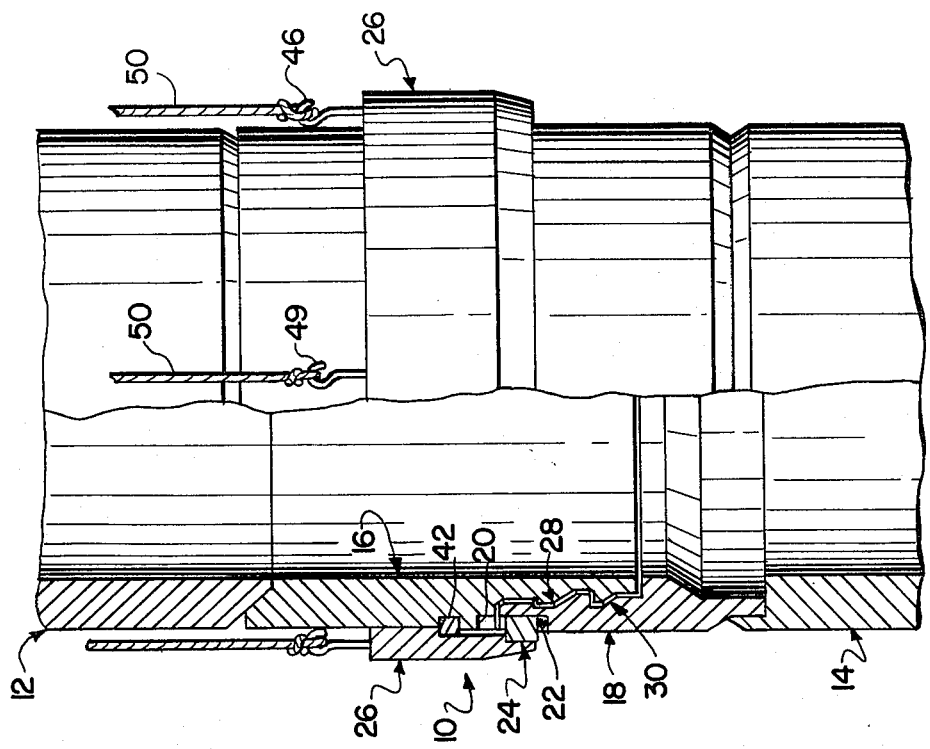
FIG. 2 is a view similar to that shown in FIG. 1 except that the latch has been moved out of the locking position by downward movement of the release ring.

FIG. 18 is a sectional view similar to that shown in FIG. 17 except that the ring has moved downwardly, has engaged the latch and moved the latch out of the locking position so that only the removable portion coupled by the shear pin remains in the first recess; and FIG. 19 is a side elevational view in section taken along lines 19—19 except that the male and female members have undergone relative rotation thereby breaking the shear pin.

EMBODIMENT OF FIGS. 1-6

Referring now to FIGS. 1-6, the remotely releasable connector 10 according to the invention couples a first joint of pipe 12 and a second joint of pipe 14 which can be, for example, joints in a large diameter pipe string.

The connector 10 comprises a male connector member 16 suitably connected, such as by welding, to the first joint of pipe 12, a female connector member 18 suitably connected, such as by welding, to the second joint of pipe 14, a first recess 20 in the exterior of the male connector member, a second recess 22 in the exterior of the female connector member, a latch 24 received in the aligned recesses, and the release ring 26 supported on the exterior of the pipes.

Figure 1:
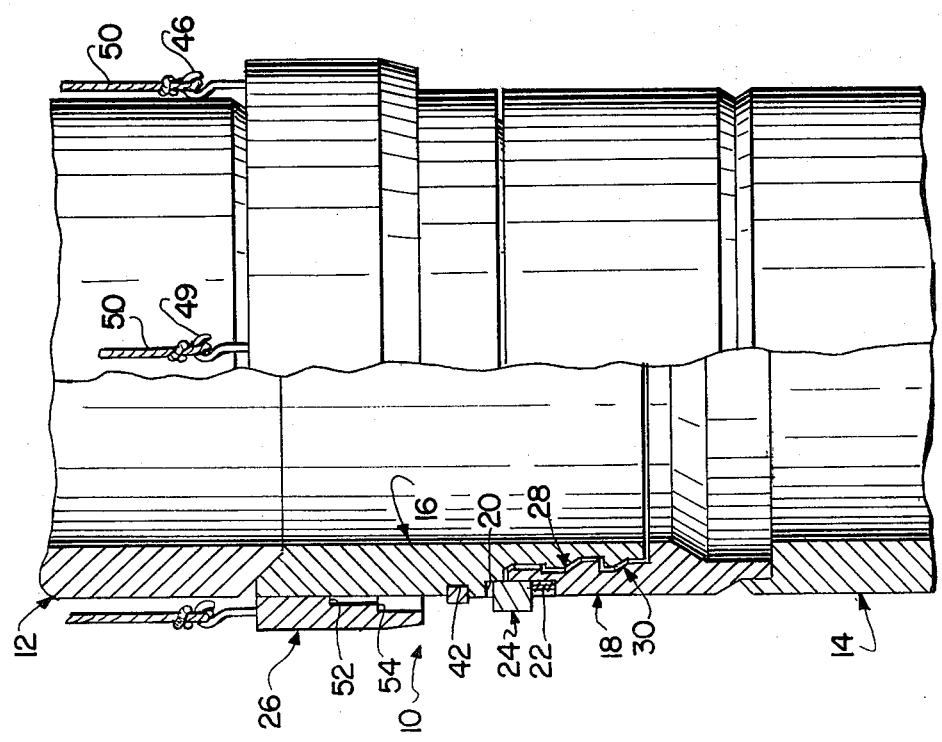
FIG. 1 is an elevational view in partial section of a connector according to a first embodiment of the invention with the latch in the locking position.

The male and female connector members are threadedly engaged by means of a first set of threads 28 on the male connector member and a second set of threads 30 on the female connector member. As shown in FIGS. 1 and 2, these threads are of the interrupted, quick make-and-break type disclosed in commonly assigned U.S. Pat. No. 4,209,191, issued June 24, 1980, the disclosure of which is hereby incorporated by reference. This threaded engagement of the male and female connector members can also be accomplished by continuous, helical threads or interrupted threads of the lead type. In addition, the upper connector member seen in FIG. 1 could be the female and the lower connector member could be the male.

In any case, to make up the connection, the male and female connector members 16 and 18 are rotated so the first and second sets of threads 28 and 30 are engaged. In such engaged position, the first and second recesses 20 and 22 are substantially aligned longitudinally of the pipes 12 and 14, as best seen in FIG. 3, and the latch 24 is positioned so that a first part is located in the first recess and a second part is located in the second recess. This prevents relative rotation of the first and second pipes, thereby locking the pipes together. In order to remotely release this connection, the release ring 26, as seen in FIGS. 1 and 2, is moved downwardly so that it contacts a third part of the latch, as seen in FIG. 5, which extends outwardly from the recesses and pushes the latch downwardly so that it is completely located in the second recess 22. This allows relative rotation of the first and second pipes so that the coupling can be released.

As seen in FIG. 3, the latch 24 is in the form of a parallelopiped and has a longitudinal length less than the longitudinal extent of recesses 20 and 22. These recesses are in the form of longitudinally extending slots in the exterior of the male and female members 16 and 18 and are substantially aligned when the sets of threads are fully engaged.

The latch 24 is supported in the locking position shown in FIG. 3 by means of a bolt 32 suitably rigidly coupled to the bottom of recess 22, the bolt 32 extending into a bore 34 in the bottom of the latch 24 and having an enlarged head 36 received in a second enlarged coaxial bore 38 extending from bore 34 to the top of latch 24. A helical compression spring 40 surrounds bolt 32 and is interposed between the bottom of latch 24 and the bottom of recess 22 and upwardly biases the latch into the locking position shown in FIG. 3 in which the top part of the latch is located in recess 20 and the lower part of the latch is located in recess 22.

Located above the latch 24, is a ring 42 received in a transverse annular slot 44 in the male connector member 16. This ring 42 extends outwardly from the exterior surface of connector member 16 a distance less than the latch 24 extends outwardly therefrom, as best seen in FIG. 4. The ring 42 can be bolted onto the connector member 16 or can be a split ring which snaps thereon.

Referring now to FIGS. 1, 2, 5 and 6, the release ring 26 is shown having an interior diameter slightly larger than the exterior diameter of the pipes so that it can slide longitudinally along the pipes. As seen in FIG. 6, the ring can be formed from two sections hingedly coupled by two eye-bolts 46 and 47, with two additional eye bolts 48 and 49 also being provided. As seen in FIGS. 1 and 2, these eye bolts fasten the ring to lowering lines 50 for a controlled downward movement of the ring. Alternatively, the ring can be allowed to free-fall. By making the ring of two hingedly connected sections, it is easy to place the ring around the pipes at any desired location. Alternatively, more than two sections could be used to make up the ring or the ring could be integrally formed.

As seen in FIG. 5, the release ring 26 has a downwardly facing, transverse stop shoulder 52 for engagement with the ring 42 extending from male connector member 16 which ring thereby also acts as a mating stop shoulder. A second actuating shoulder 54, which is downwardly facing and transverse, is located below stop shoulder 52. The longitudinal distance between stop shoulder 52 and actuating shoulder 54 is equal to or greater than the distance between the top of the ring 42 and the top of the second recess 22. This assures downward movement of latch 24 a sufficient distance so that no part is located in the first recess 20 after contact with ring 26.

As seen in FIG. 5, the bottom of ring 26 has an inwardly directed tapered section 56 which can be useful in case the ring must pass through silt or mud during the releasing operation. Similarly, the latch 24 can also have such a tapered section at the bottom thereof.

To remotely release the connector 10, the release ring 26 is allowed to move downwardly into a position shown in FIGS. 2 and 5. As seen therein, the actuating shoulder 54 moves the latch 24 out of the locking position by contacting a part of the latch which extends outwardly from recesses 20 and 22. As seen in FIG. 5, the latch 24 is completely contained in the second recess 22, with no part of the latch remaining in the first recess 20. Thus, relative rotation of pipes 12 and 14 can take place, thereby releasing the connection. As seen in FIG. 5, in the unlocked position, the release ring 26 is supported by ring 42 engaging stop shoulder 52. In this position, the latch 24 has been moved downwardly along bolt 40.

EMBODIMENT OF FIGS. 7-11

Referring now to FIGS. 7-11, the second embodiment of the invention is shown in which the latch 60 is biased downwardly and is moved from the locked position by means of an upward movement of a release ring 62. This latch can be used with the joints of pipe 12 and 14, the sets of threads 28 and 30 and the male and female connector members 16 and 18 described above regarding FIGS. 1-6.

Figure 8:
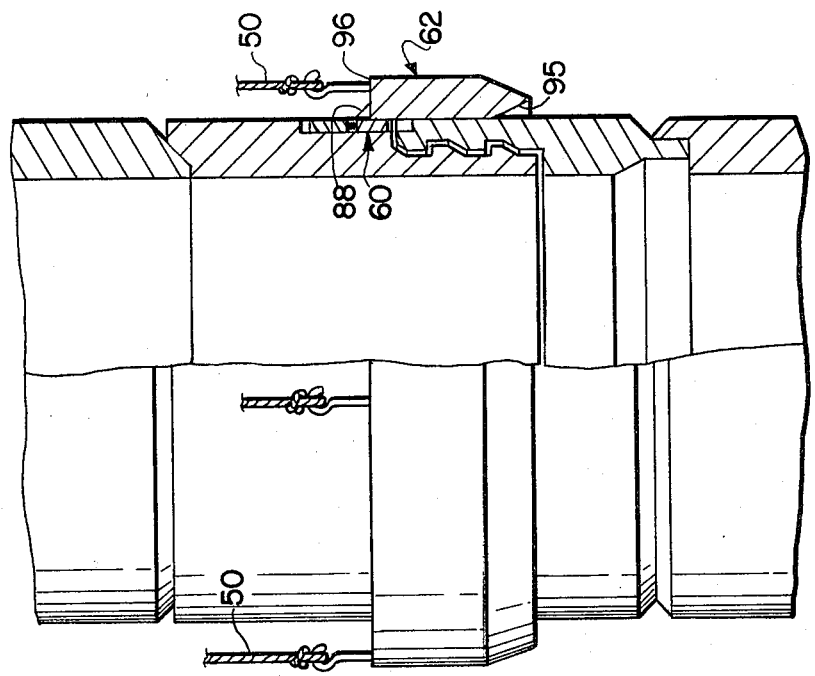
FIG. 8 is a view similar to that shown in FIG. 7 except that the release ring has engaged the latch moving it out of the locking position.
Figure 9:
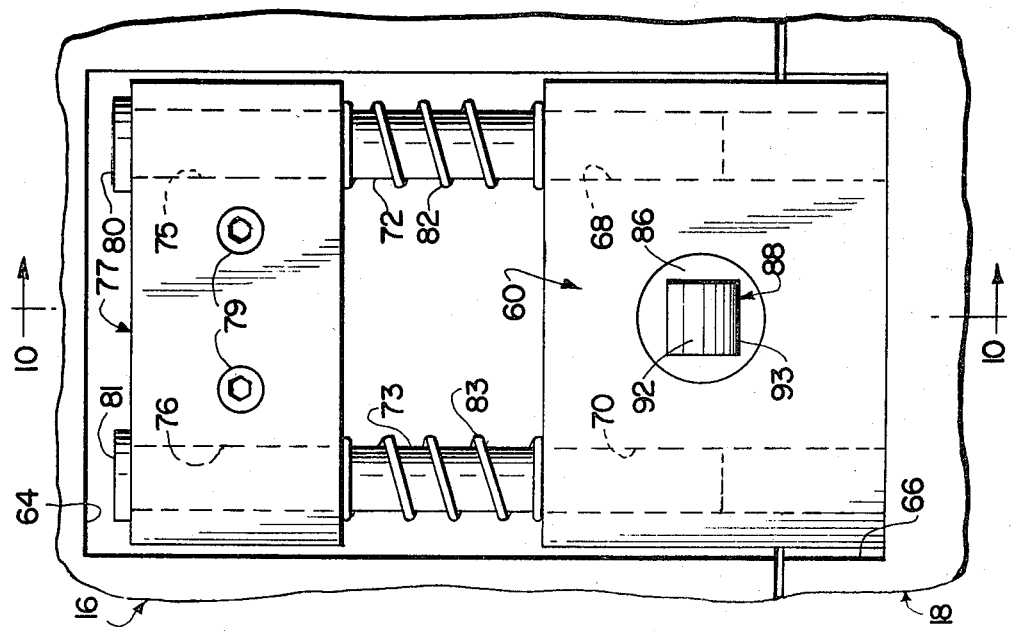
FIG. 9 is an enlarged elevational view of the latch shown in FIG. 7 in the locking position.

As seen in FIG. 9, the male connector member 16 has a first recess 64 therein and the female connector member 18 has a second recess 66 therein which are longitudinally aligned in the engaged position shown in FIGS. 7-11.

The latch 60 is a parallelepiped having two longitudinally extending bores 68 and 70 extending from the top to the bottom, as seen in FIG. 9. These bores receive bolts 72 and 73 which also are received in longitudinally extending bores 75 and 76 in a support block 77 rigidly coupled by means of fasteners 79 inside the first recess 64. Bolts 72 and 73 have enlarged heads 80 and 81, respectively, received on the top of support block 77. Interposed between the bottom of support block 77 and the top of the latch 60 and wrapped around bolts 72 and 73 are two helical compression springs 82 and 83, which bias the latch downwardly into the second recess 66.

Figure 10:
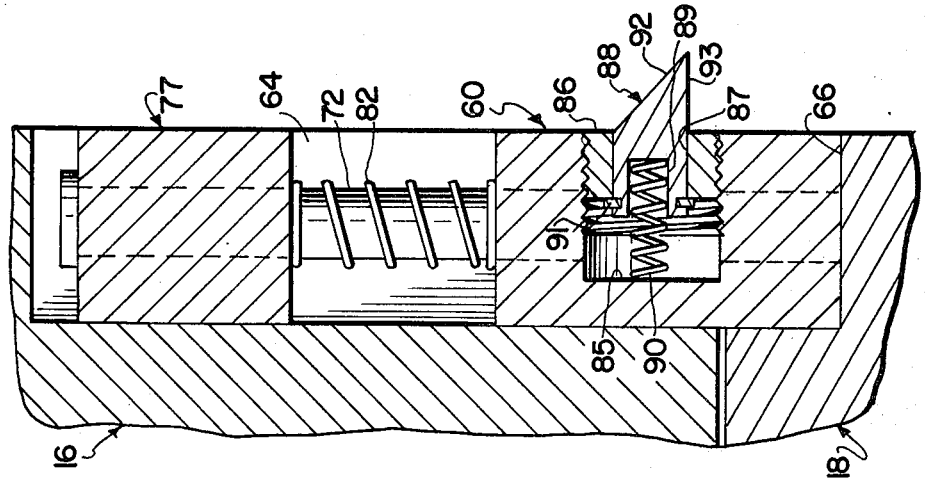
FIG. 10 is a sectional view taken along lines 10—10 in FIG. 9 showing the latch in the locking position.

As seen in FIG. 10, the latch 60 has a transverse blind bore 85 which is partially threaded to receive an externally threaded plug 86 which has a rectangular bore 87 for slidably receiving a latch pin 88, having a rectangular cross section. The latch pin 88 has a blind bore 89 on its inside end for receiving a compression spring 90 which abuts against the bottom wall of blind bore 85 in latch 60. A retaining ring 91 is received in a suitable annular slot near the inside end of the latch pin 88 to prevent the pin from exiting plug 86. A similar pin is disclosed in U.S. Pat. No. 3,268,241 issued to Castor et al, the disclosure thereof hereby being incorporated by reference.

Figure 11:
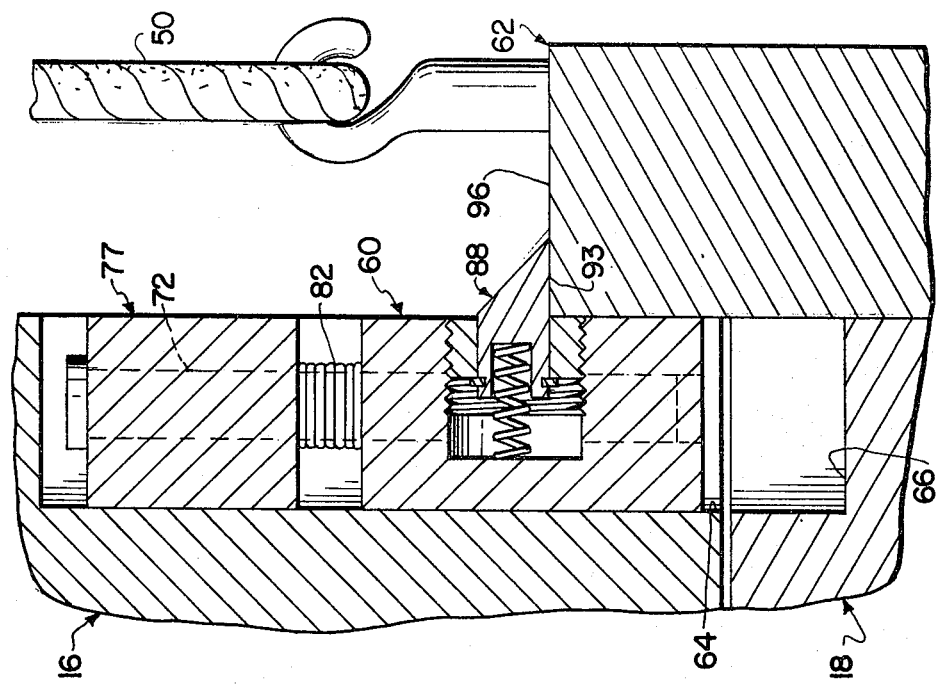
FIG. 11 is a view similar to that shown in FIG. 10 except that the release ring has engaged the latch and moved it out of the locking position.

As seen in FIGS. 10 and 11, a portion of the latch pin 88 extends outwardly from the blind bore 85 in plug 86, this portion comprising an upper surface 92 having an outward and downward taper and a lower surface 93 which is substantially planar.

Figure 7:
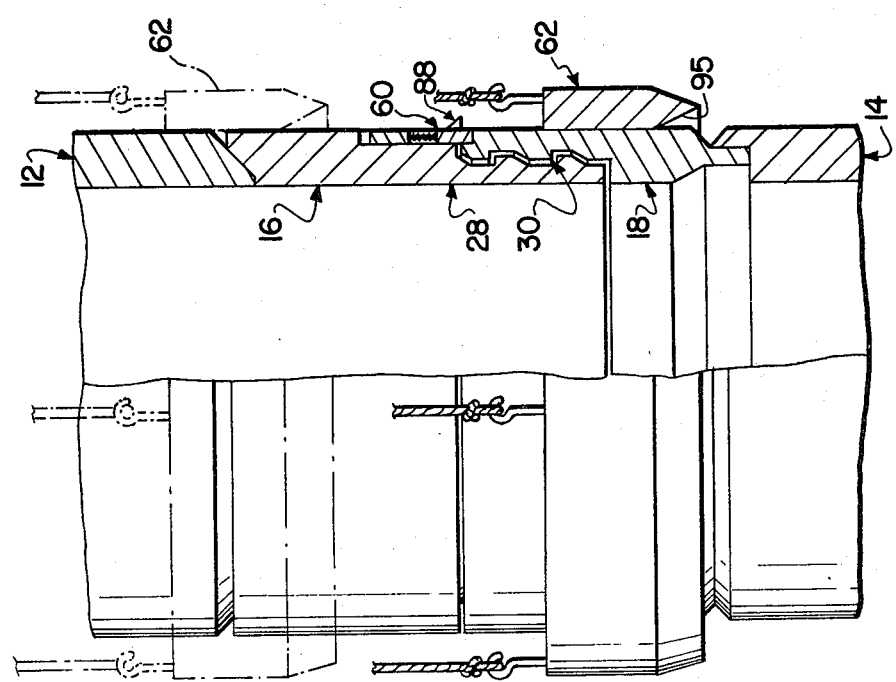
FIG. 7 is an elevational view in partial section of a second embodiment of the invention with the latch in the locking position.

As seen in FIGS. 7 and 8, the release ring 62 has an outwardly and downwardly tapered shoulder 95 at the bottom thereof adjacent the exterior of pipes 12 and 14 and has a substantially planar actuating shoulder 96 at the top thereof.

To remotely release the latch 60 from its locking position shown in FIG. 7, the release ring 62 is moved from a position shown in FIG. 7 in phantom downwardly below latch 60 to the position shown in solid lines in FIG. 7. During this downward movement tapered shoulder 95 on release ring 62 contacts the upper surface 92 on latch pin 88 and, via a camming action, drives the latch pin 88 into plug 86 so that the release ring 62 can move downwardly past the latch. Then, the release ring 62 is upwardly raised by means of lines 50 so that the actuating shoulder 96 at the top thereof can engage the lower surface 93 of the latch pin, as seen in FIG. 11, and drive the latch 60 upwardly from the position shown in FIG. 10 to that shown in FIG. 11. In this manner, the latch 60, which in the locking position had a first part in the first recess 64 and a second part in the second recess 66, now has no part thereof in the second recess 66.

Thus, relative rotation between the male and female connector members 16 and 18 can take place, thereby uncoupling the connection of pipes 12 and 14.

As is evident from FIGS. 10 and 11, the latch pin 88 forms a part of the latch which extends outwardly from the recesses and which can be acted upon by the release ring.

EMBODIMENT OF FIGS. 12-14

Figure 14:
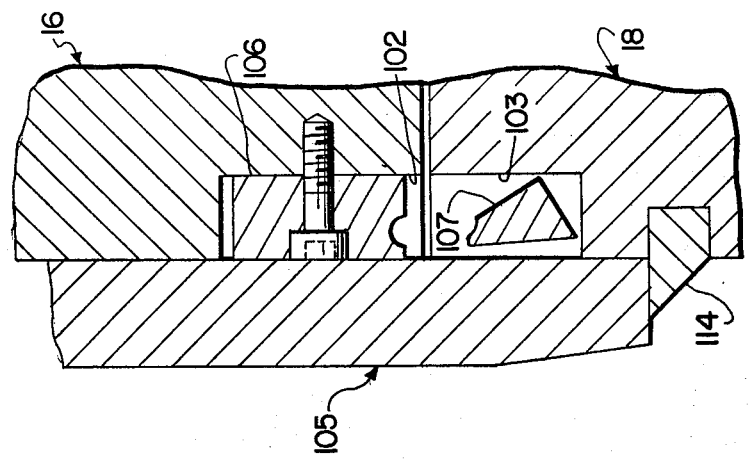
FIG. 14 is a view similar to that shown in FIG. 13 except that the release ring has moved downwardly and broken away a part of the latch so that the connector is in the unlocked condition.
Figure 13:
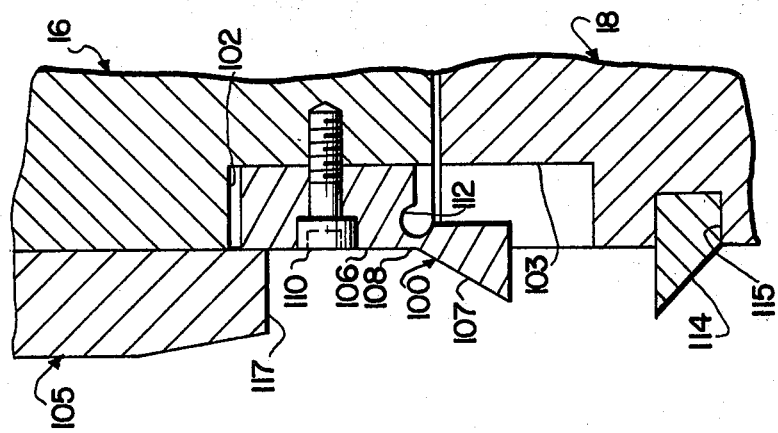
FIG. 13 is a sectional view taken along lines 13—13 in FIG. 12.
Figure 12:
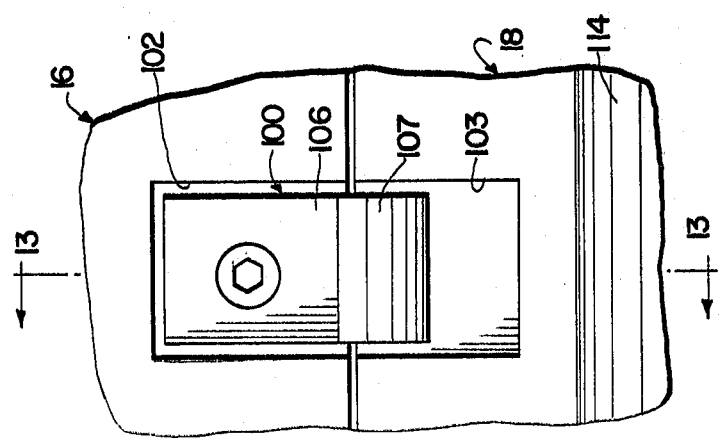
FIG. 12 is an elevational view of a third embodiment of the invention showing the latch in the locking position.

Referring now to FIGS. 12-14, a third embodiment of the invention is shown in which a latch 100 is rigidly supported in aligned recesses 102 and 103 and is removed from the locking position by downward movement of a release ring 105 which accomplishes the unlocking by breaking a part of the latch.

As seen in FIGS. 12 and 13, the two aligned recesses 102 and 103 are formed respectively in the male connector member 16 and the female connector member 18. The latch 100 comprises a base portion 106, a locking portion 107 and a frangible portion 108 coupling the base and locking portions.

The base portion 106 is in the form of a parallelopiped and is rigidly secured inside recess 102 by means of a suitable bolt 110 received in the base portion 106 and in the male connector member 16. As seen in FIG. 13, the entire part of the base portion 106 is located in the first recess 102.

The locking portion 107 is in the form of substantially a right trapezoid and has a first part located in the first recess 102, a second part located in the second recess 103 and a third part extending outwardly from the recesses.

A thin strip of material forms the frangible portion 108, which integrally connects the base portion 106 and the locking portion 107. As seen in FIG. 13, a bore 112 transverse of the latch 100 is formed therein to provide the reduced thickness frangible portion. The circumference of the bore is approximately 270°.

Such a latch provides little strength to resist forces tending to push radially inward of the connector members 16 and 18 but provides good strength against tangential loads. Thus, as seen in FIGS. 12 and 13, the latch 100 will prevent relative rotation of the connector members 16 and 18 since the locking portion 107 is located in both recesses 102 and 103.

Located below the second recess 103 is a stop ring 114 received in an inwardly directed, transverse slot 115 on the outside of connector member 18.

The release ring 105 has a downwardly facing transverse annular actuating shoulder 117 at the bottom thereof for engagement with locking portion 107 and stop ring 114.

To remotely release latch 100 from the locking position shown in FIG. 13, the release ring 105 is moved downwardly so that actuating shoulder 117 contacts that part of the locking portion 107 which extends outwardly from recesses 102 and 103. The release ring 105 continues to move downwardly after initial contact and causes the latch 100 to break at the frangible portion 108 so that the locking portion 107 separates from the base portion 106, falling completely into recess 103, as seen in FIG. 14. This frees the male and female connector members to rotate relatively, thereby releasing the connection. As seen in FIG. 14, the release ring 105 can continue downwardly where it engages stop ring 114 which stops its downward movement.

As best seen in FIG. 14, the latch 100 breaks under the influence of release ring 105 so that no part of the latch remains extending across from one recess to the other.

EMBODIMENT OF FIGS. 15 AND 16

Figure 16:
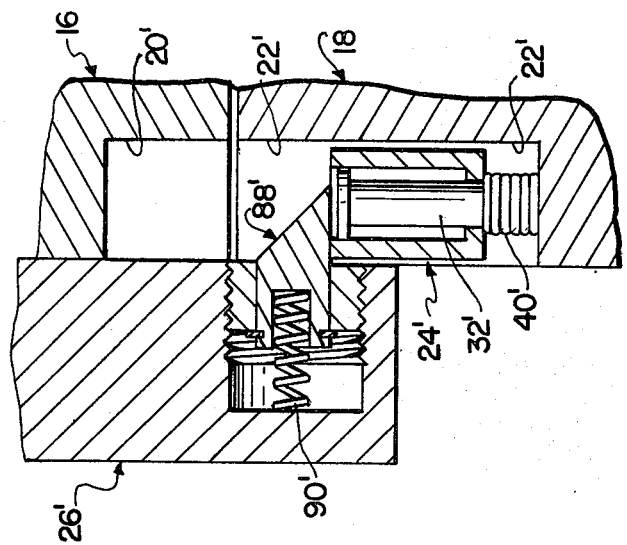
FIG. 16 is a sectional view similar to that shown in FIG. 15 except that the ring has been lowered, the latch pin has moved radially inward of the pipes into the recess and the latch pin has moved the latch out of the locking position.
Figure 15:
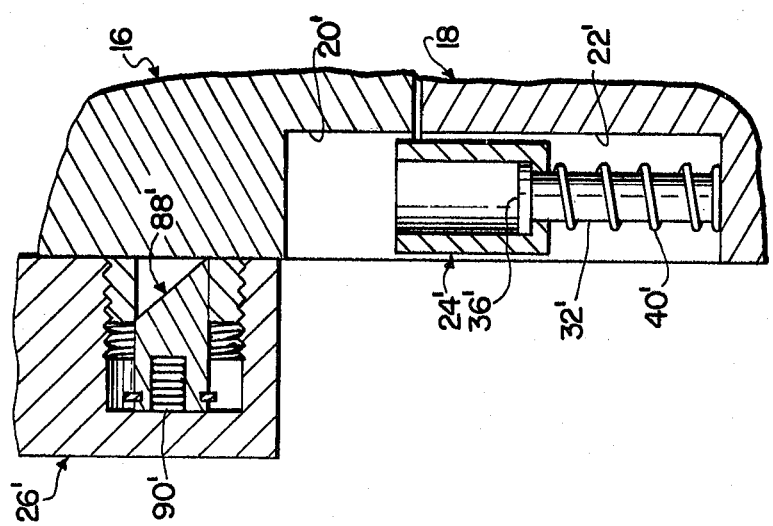
FIG. 15 is a sectional view of a fourth embodiment of the invention with the latch in a locking position and with a spring biased latch pin slidably received on the ring.

Referring to FIGS. 15 and 16, a fourth embodiment of the invention is shown in which a latch 24' is supported in aligned recesses 20' and 22' to lock the male and female connectors 16 and 18 in a manner similar to the first embodiment shown in FIGS. 1-5. The basic differences from the first embodiment are that recesses 20' and 22' have longer longitudinal dimensions, latch 24' is longer and bolt 32' is longer, these parts being otherwise the same as that described above regarding FIGS. 1-5 and are therefore given the same reference numerals with the addition of a prime.

The top of latch 24' in the locked position shown in FIG. 15 is spaced from the top of the recess 20' so a latch pin 88' slidably received in the ring 26' can enter this space as it extends out from the ring under the influence of spring 90' and can contact the top of the latch 24' and drive it downwardly out of the locking position. This is shown in FIG. 16 with the entire part of the latch 24' being located in recess 22'.

The ring 26' has the same structure inside it to support the slidable latch pin 88' as does latch 60 shown in FIGS. 7-11 and described in detail hereinabove. In addition, latch pin 88' is made the same way as is latch pin 88 described hereinabove.

Thus, in this fourth embodiment rather than the latch having a part extending outward of the recesses, the ring has a latch pin which can extend into the recesses, engage the latch and drive it into an unlocking position. This is accomplished by moving the ring downwardly on the outside of the pipes and biasing the latch pin radially inward of the pipes. Once the latch pin coincides with the space in recess 20' between the top of the recess and the top of the latch, the spring biases the latch pin inwardly, so it can contact the latch and, through additional downward movement of the ring, move the latch out of the locking position. As an alternate construction, the latch pin can contact the latch by being received in a recess in the latch itself.

As another alternate, not shown, the latch could be downwardly biased into the locking position like latch 60 in FIG. 9 and the ring could move the latch upwardly out of the locking position by first moving downwardly past the latch and then upwardly with the latch pin being received in the recess below the latch, or in a recess in the latch itself. In such a construction, the flat part of the latch pin would be on the top.

EMBODIMENT OF FIGS. 17-19

Referring to FIGS. 17-19, a fifth embodiment of the invention is shown which is the same as that shown in FIGS. 1-5 except that the latch 24" has a removable portion 120 which is frangibly coupled to the top of the latch 24" by a frangible shear pin 122. In addition, recesses 20" and 22" are deeper. The remaining parts are the same and are given the same reference numerals as used in FIGS. 1-5.

As seen in FIG. 17, the latch 24" is in a locking position with a part thereof being in recess 20" and another part being in recess 22". The removable portion 120 is located above the parting line of the male and female members 16 and 18 and in recess 20".

When the ring 26 moves downwardly along the outside of the pipes and into contact with the latch 24", it moves the latch downwardly so the removable portion 120 has its lower flat surface at the parting line between members 16 and 18 as seen in FIG. 18. Thus, all of the removable portion is in recess 20" and no portion is in recess 22". Upon relative rotation of members 16 and 18, as shown in FIG. 19, the side of recess 20" contacts the removable portion 120, which shears the shear pin 122 and moves the removable portion 120 circumferentially away from the remaining part of the latch 24".

Thus, in the position shown in FIG. 18, the latch is in an unlocked position with only the strength of the shear pin 122 preventing relative rotation of the members 16 and 18 and disengagement thereof. This allows the connector to be placed in a prerelease condition before actual disengagement. This removable portion can be used in the embodiment of FIG. 9 as well.

What is claimed is:

1. A remotely releasable connector for first and second pipes, the combination comprising:
   first and second sets of engageable threads coupled to the first and second pipes;
   a first recess in the exterior of the first pipe;
   a second recess in the exterior of the second pipe, said recesses being substantially aligned when the pipes are threadedly engaged;
   a latch;
   means for supporting said latch in a locking position so that a first part is located in said first recess, and a second part is located in said second recess, thereby preventing disengagement of the pair of pipes; and
   release ring means, supported around the exterior of said pipes, for moving said latch out of the locking position by contacting said latch upon movement of said release ring means longitudinally of said pipes,
   the smallest interior diameter of said ring means that contacts said latch being slightly larger than the largest exterior diameter of at least one of said pipes adjacent said latch,
   said ring means being freely slidable along at least one of the pipes to at least the latch contacting position solely under the influence of gravity.

2. A remotely releasable connector according to claim 1, wherein said means for supporting comprises
   a longitudinal bore formed in said latch;
   a rod rigidly coupled to the second pipe in said second recess; and
   bias means, coupled to said rod, for biasing said latch into said locking position.

3. A remotely releasable connector according to claim 1, wherein
   said release ring means has a transverse, downwardly facing shoulder for engaging said latch.

4. A removely releasable connector according to claim 3, wherein the first pipe joint has an outwardly extending stop shoulder located above said first recess; and said release ring means has a second transverse, downwardly facing shoulder for engaging said stop shoulder.

5. A remotely releasable connector according to claim 4, wherein the longitudinal distance between said first and second shoulders on said release ring is at least equal to the distance between the top of said stop shoulder and the top of said second recess.

6. A remotely releasable connector according to claim 1, wherein said release ring means includes a plurality of fasteners located on the top thereof for connection to lines for lowering said release ring means.

7. A remotely releasable connector according to claim 1, wherein said release ring means comprises at least two sections hingedly coupled together.

8. A remotely releasable connector according to claim 1, wherein said latch has means extending therefrom out of said recess for contact by said ring means.

9. A remotely releasable connector according to claim 1, wherein one of said ring means and said latch has means extending therefrom for contacting the other of said ring means and said latch.

10. A method of remotely releasing a connector threadedly engaging a pair of pipes and having a latch located in two aligned recesses in the exterior of the pipes, comprising the steps of biasing the latch upwardly so that a first part is located in the first recess, a second part is located in the second recess and a third part extends outwardly from the recess, and moving a ring, solely under the influence of gravity, downwardly around the exterior of the pipes into contact with the latch to drive the first part of the latch out of the first recess, the moving step including freely sliding the ring along one of the pipes to the latch contacting position.

11. A method of remotely releasing a connector threadedly engaging a pair of pipes and having a latch located in two aligned recesses in the exterior of the pipes, comprising the steps of securing the latch in the recesses in a locking position so that a first part is located in the first recess, and a second part is located in the second recess, and moving a ring longitudinally around the exterior of the pipes into contact with the latch to release the latch from the locking position, the moving step including freely sliding the ring along one of the pipes to at least the latch contacting position solely under the influence of gravity from a position in which no part of the ring overlaps the latch.

12. A method according to claim 11 wherein the moving step includes contacting the ring with a part of the latch extending out of the recesses.

13. A method of remotely releasing a connector threadedly engaging a pair of pipes and having a latch located in two aligned recesses in the exterior of the pipes, comprising the steps of securing the latch in the recesses in a locking position so that a first part is located in the first recess, and a second part is located in the second recess, and moving a ring longitudinally around the exterior of the pipes into contact with the latch to move the latch into a position in which the pairs of pipes can be disengaged by relative rotation, the moving step including freely sliding the ring along one of the pipes to at least the latch contacting position solely under the influence of gravity from a position in which no part of the ring overlaps the latch.

14. A method according to claim 13, wherein the securing step includes biasing the latch downwardly so that a first part is located in the first recess, a second part is located in the second recess and a third part extends outwardly from the recess, and the moving step includes moving a ring, solely under the influence of gravity, downwardly around the exterior of the pipes past the third part of the latch, and then moving the ring upwardly around the exterior of the pipes into contact with the third part of the latch to drive the second part of the latch out of the second recess.

15. A method according to claim 14, wherein the first moving step includes biasing the third part of the latch radially inwardly of the pipes.

16. A method according to claim 13, wherein the securing step includes securing the latch in the recesses in a locking position so that a third part extends outwardly from the recess, and the moving step includes moving a ring, solely under the influence of gravity, longitudinally around the exterior of the pipes into contact with the third part of the latch, and continuing such movement to break the latch, thereby releasing the latch from the locking position.

17. A method according to claim 13 wherein the moving step includes contacting the latch with a part of the ring extending into the recesses.

18. A method according to claim 13, and further comprising the step of rotating the pipes in the disengaging direction to remove a portion of the latch therefrom.

19. A remotely releasably connector for first and second pipes, the combination comprising:

first and second sets of engageable threads coupled to the first and second pipes;

a first recess in the exterior of the first pipe;

a second recess in the exterior of the second pipe, said recesses being substantially aligned when the pipes are threadedly engaged;

a latch;

means for supporting said latch in a locking position so that a first part is located in said first recess, and a second part is located in said second recess, thereby preventing disengagement of the pair of pipes; and release ring means, supported around the exterior of said pipes, for moving said latch into a position in which the pipes can be disengaged by relative rotation by contacting said latch upon movement of said release ring means longitudinally of said pipes, the smallest interior diameter of said ring means that contacts said latch being slightly larger than the largest exterior diameter of at least one of said pipes adjacent said latch, said ring means being freely slidable along at least one of the pipes to at least the latch contacting position solely under the influence of gravity.

20. A remotely releasable connector for first and second pipes, the combination comprising:

first and second sets of engageable threads coupled to the first and second pipes;

a first recess in the exterior of the first pipe;

a second recess in the exterior of the second pipe, said recesses being substantially aligned when the pipes are threadedly engaged;

a latch;

means for supporting said latch in a locking position so that a first part is located in said first recess, and a second part is located in said second recess, thereby preventing disengagement of the pair of pipes; and release ring means, supported around the exterior of said pipes, for moving said latch out of the locking position by contacting said latch upon movement of said release ring means longitudinally of said pipes, said ring means being freely slidable solely under the influence of gravity along at least one of the pipes from a position in which no part of said ring means overlaps said latch to at least the latch contacting position.

21. A remotely releasable connector according to claim 20, wherein said means for supporting comprises a longitudinal bore formed in said latch;

a rod rigidly coupled to the first pipe in said first recess; and bias means, coupled to said rod, for biasing said latch into said locking position.

22. A remotely releasable connector according to claim 21, wherein said latch has a transverse bore formed therein slidably receiving a latch pin;

said bore having a spring therein coupled to said latch pin for positioning said latch pin with a portion extending outwardly of said bore for engagement with said release ring means.

23. A remotely releasable connector according to claim 22, wherein said portion of said latch pin extending outwardly of said bore comprises an upper surface having an outward and downward taper, and a lower surface which is substantially planar.

24. A remotely releasable connector according to claim 20, wherein said latch comprises a base portion located in said first recess, a locking portion comprising said first and second parts of said latch, and frangible means for coupling said base portion and said locking portion.

25. A remotely releasable connector according to claim 24, wherein said means for supporting comprises a fastener rigidly coupling said base portion in said first recess.

26. A remotely releasable connector according to claim 20, wherein said ring means has a transverse bore formed therein slidably receiving a latch pin;

said bore having a spring therein coupled to said latch pin for positioning said latch pin with a portion extending therefrom for engagement with said latch.

27. A remotely releasable connector according to claim 20, wherein said latch includes a removable portion coupled thereto by a frangible member.

28. A remotely releasable connector according to claim 20, wherein said ring means has means extending therefrom into said recess for contacting said latch.

29. A method of remotely releasing a connector threadedly engaging a pair of pipes and having a latch located in two aligned recesses in the exterior of the pipes, comprising the steps of securing the latch in the recesses in a locking position so that a first part is located in the first recess, and a second part is located in the second recess, and moving a ring longitudinally around the exterior of the pipes into contact with the latch to move the latch into a position in which the pair of pipes can be disengaged by relative rotation, the moving step including freely sliding the ring along one of the pipes to at least the latch contacting position solely under the influence of gravity.

30. A remotely releasable connector for first and second pipes, the combination comprising:

first and second sets of engageable threads coupled to the first and second pipes;

a first recess in the exterior of the first pipe;

a second recess in the exterior of the second pipe, said recesses being substantially aligned when the pipes are threadedly engaged;

a latch;

means for supporting said latch in a locking position so that a first part is located in said first recess, and a second part is located in said second recess, thereby preventing disengagement of the pair of pipes; and release ring means, supported around the exterior of said pipes, for moving said latch out of the locking position by contacting said latch upon movement of said release ring means longitudinally of said pipes, said ring means being freely slidable solely under the influence of gravity along at least one of the pipes to at least the latch contacting position.

* * * * *